June 26, 1945. H. A. TRIPLETT 2,379,199
FUSE CONSTRUCTION
Filed Aug. 13, 1938 10 Sheets-Sheet 1

Inventor:
Hugh A. Triplett
By Brown Jackson Boettcher Dienner
Attys.

June 26, 1945. H. A. TRIPLETT 2,379,199
FUSE CONSTRUCTION
Filed Aug. 13, 1938 10 Sheets-Sheet 2

Inventor:
Hugh A. Triplett
By Brown Jackson Boettcher Dienner
Attys

June 26, 1945.   H. A. TRIPLETT   2,379,199
FUSE CONSTRUCTION
Filed Aug. 13, 1938   10 Sheets-Sheet 4

Inventor:
Hugh A. Triplett
By Brown Jackson Boettcher Dienner
Attys.

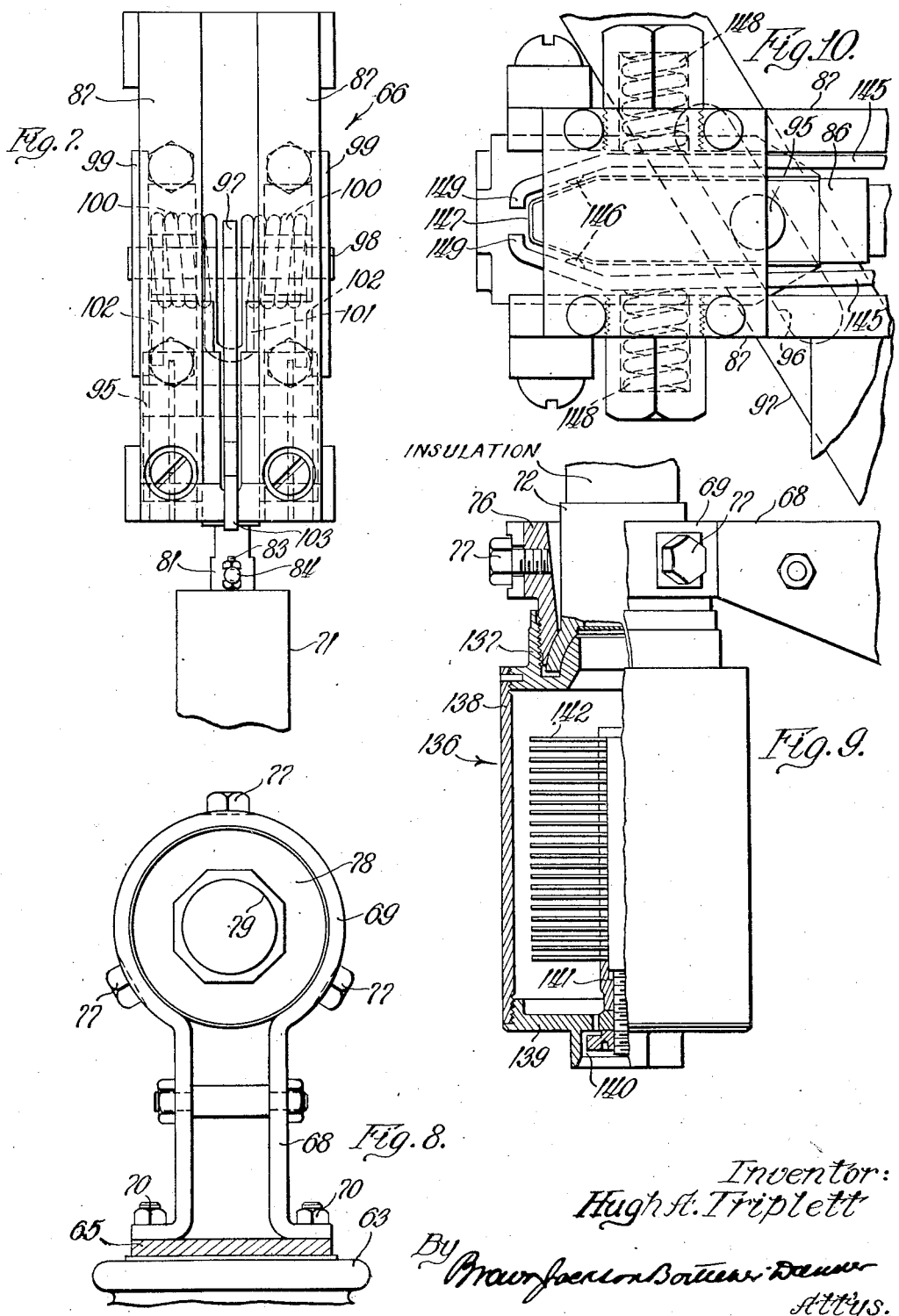

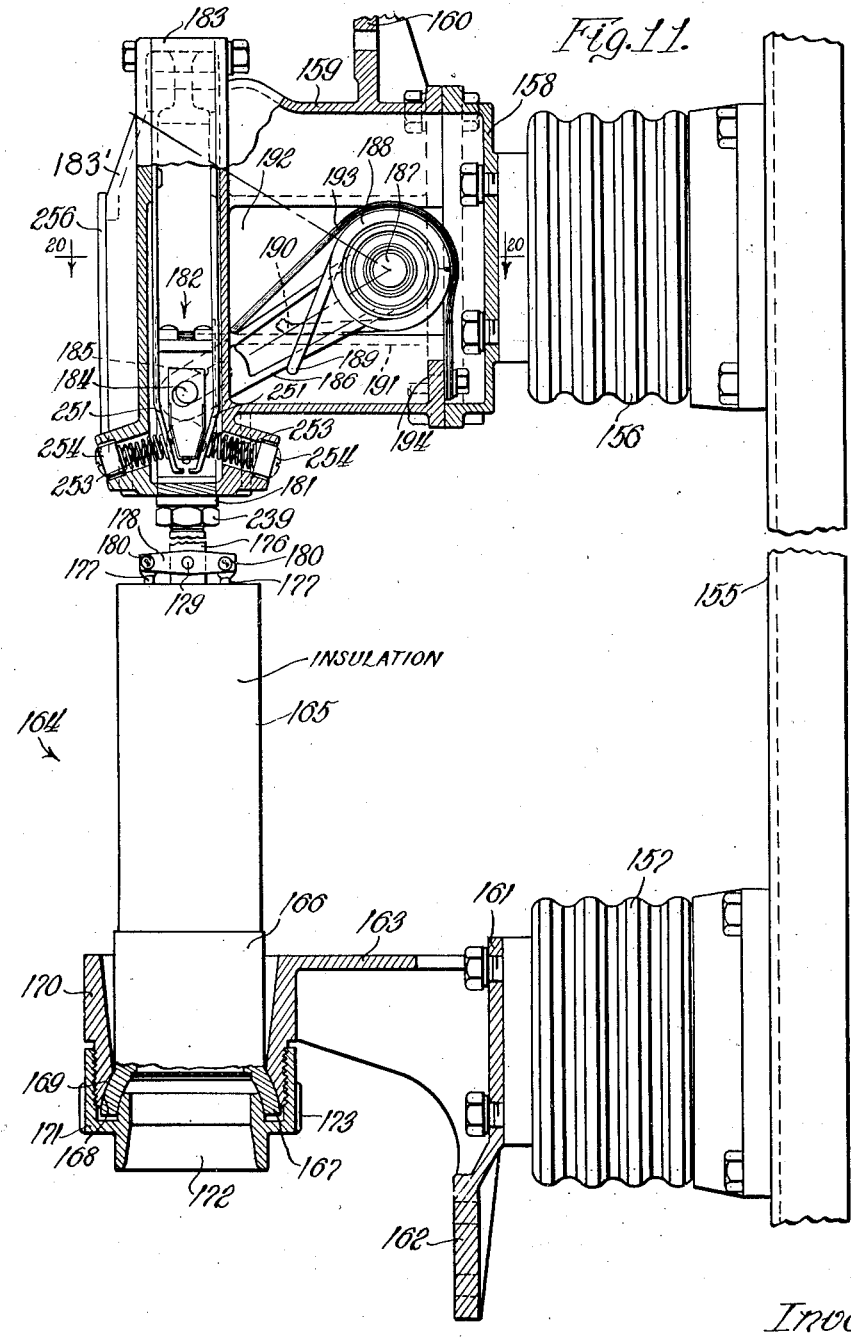

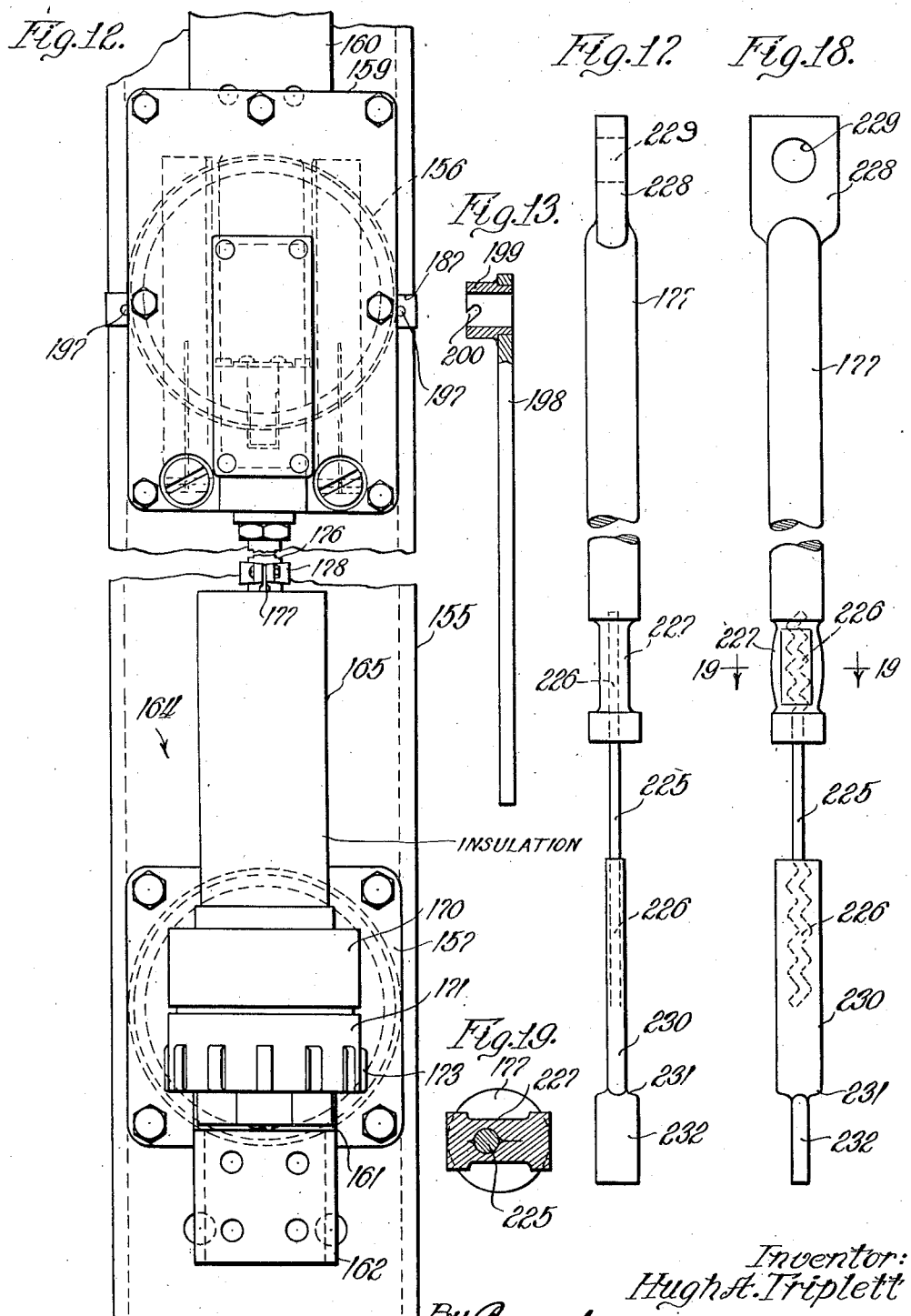

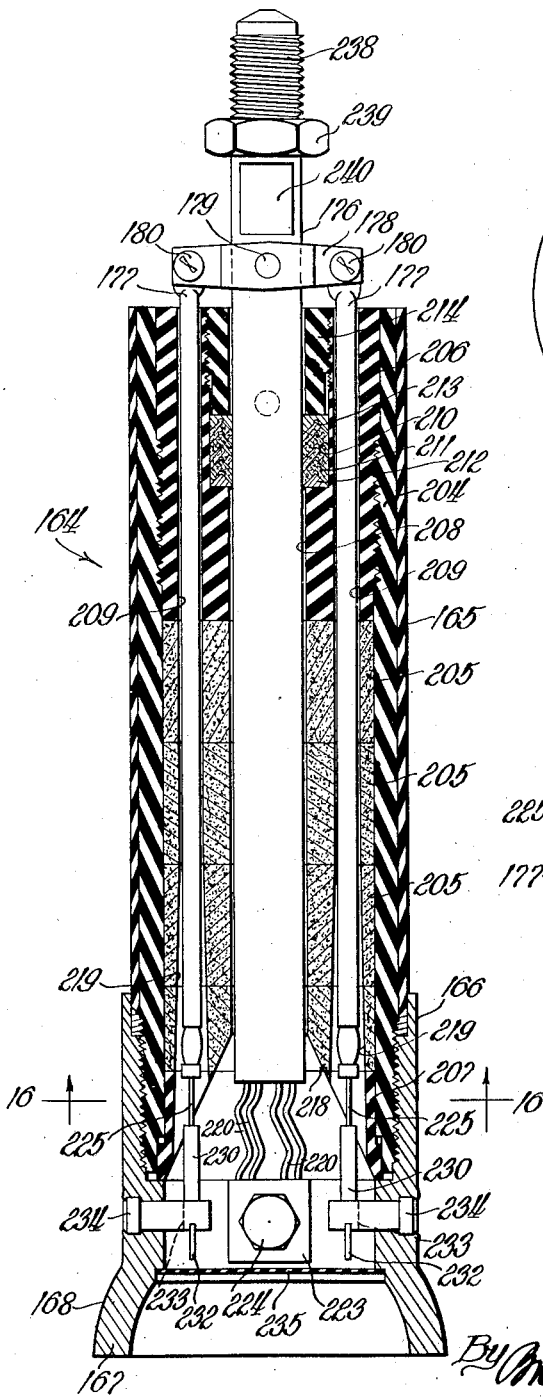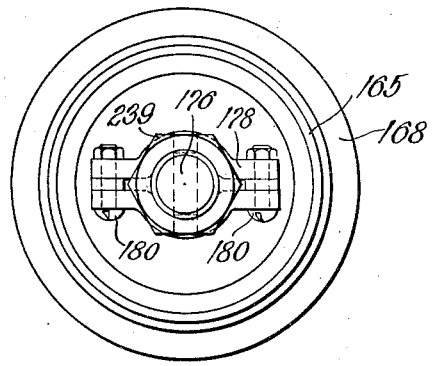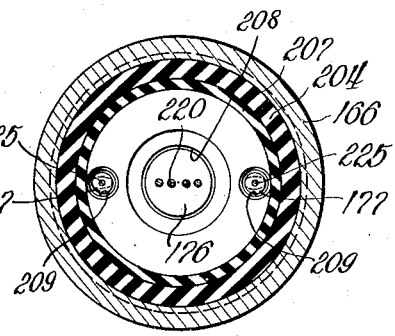

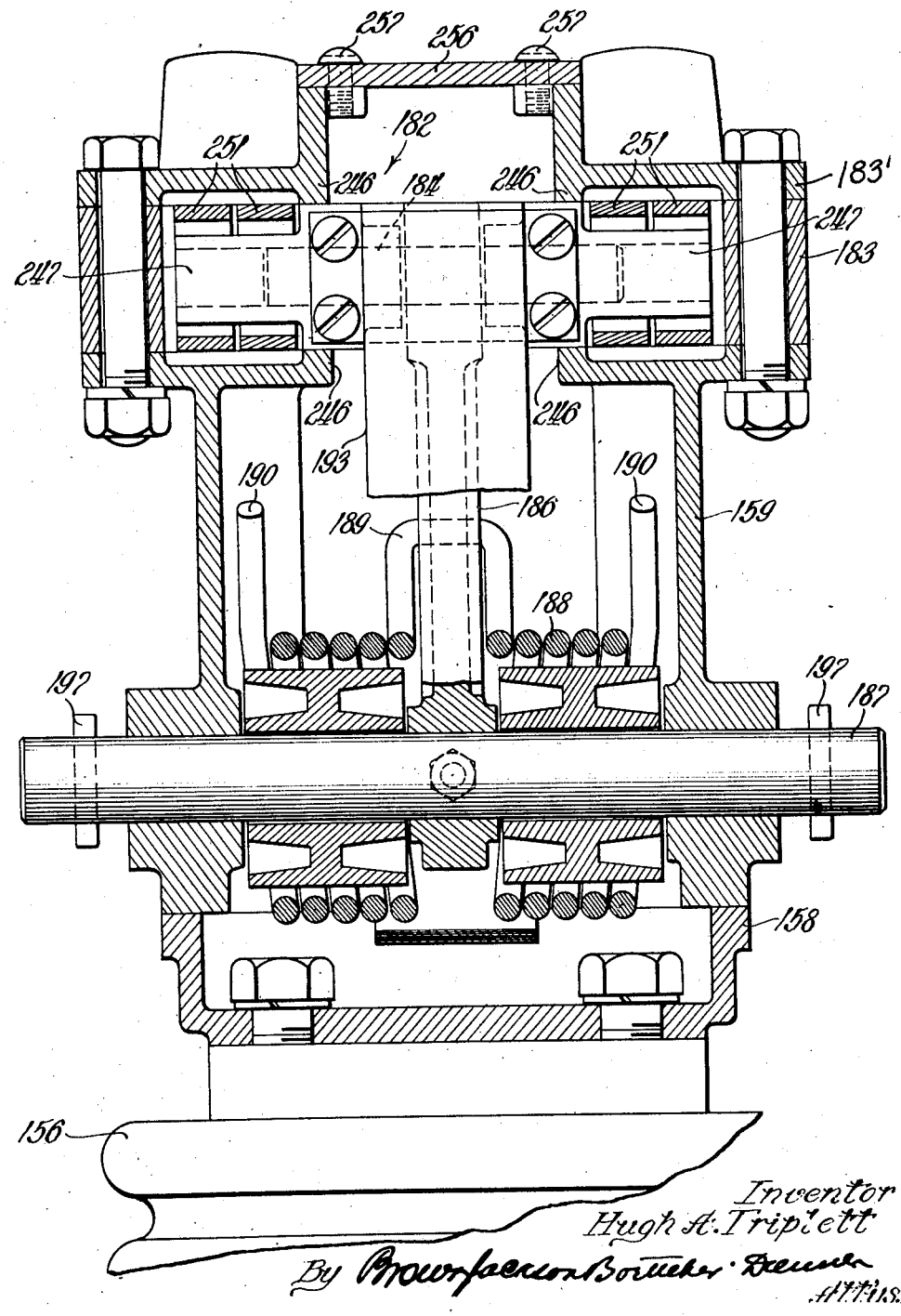

June 26, 1945.     H. A. TRIPLETT     2,379,199
FUSE CONSTRUCTION
Filed Aug. 13, 1938     10 Sheets-Sheet 10
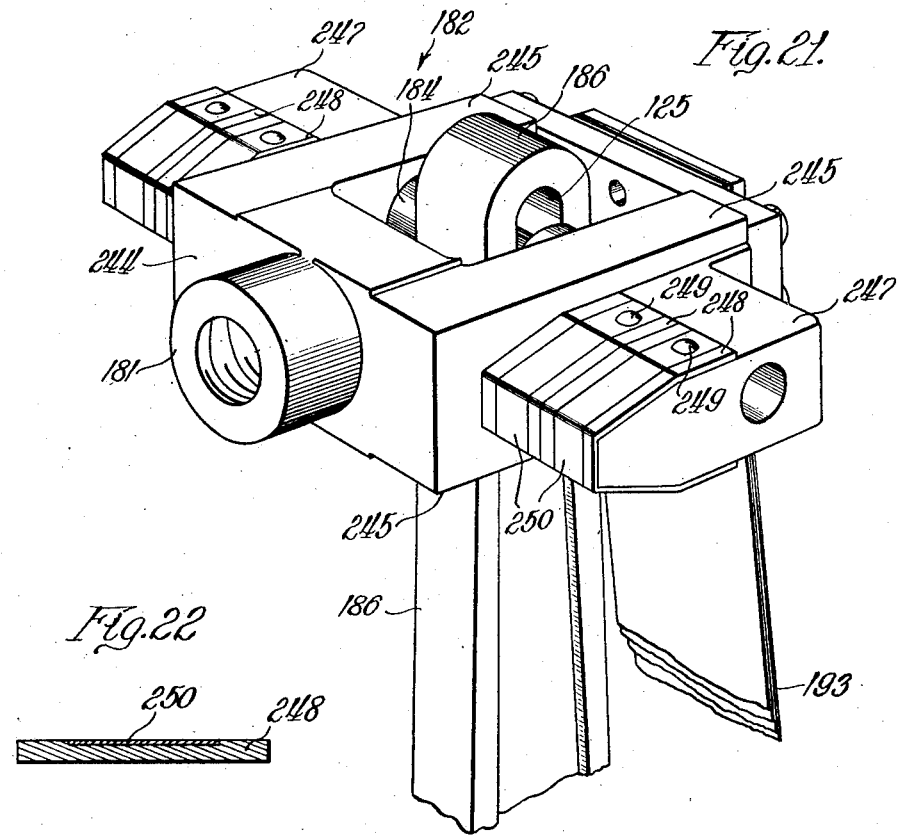
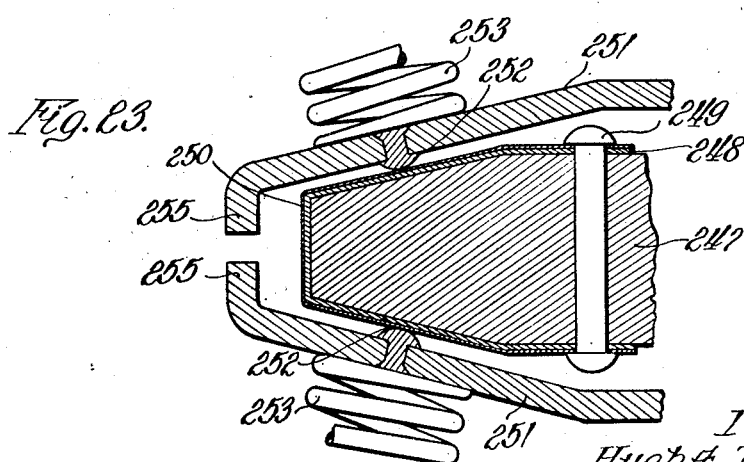
Inventor:
Hugh A. Triplett Patented June 26, 1945

2,379,199

UNITED STATES PATENT OFFICE 2,379,199

FUSE CONSTRUCTION

Hugh A. Triplett, Wilmette, Ill., assignor to Schweitzer & Conrad, Inc., Chicago, Ill., a corporation of Delaware Application August 13, 1938, Serial No. 224,696

50 Claims. (Cl. 200—114)

My invention relates, generally, to circuit interrupters. It has particular relation to fuse devices employing a solid arc extinguishing material and having normal or rated current carrying capacities of 400 to 1000 amperes at 7,500 volts, and which are capable of interrupting fault currents of 800 to 75,000 amperes at this voltage.

The object of my invention, generally stated, is to provide an improved form of heavy duty circuit interrupter that shall be simple and efficient in operation and which may be readily and economically manufactured and installed.

An object of my invention is to provide for opening a circuit operating at a relatively high voltage in which a relatively large current flows and at the same time employing the same apparatus for interrupting relatively small currents in the circuit.

Another object of my invention is to avoid the application of back pressure to the spring of a spring-operated fuse device.

A further object of my invention is to provide for proper alignment of a fuse device in relation to its operating mechanism even though the individual supports for the fuse device and operating mechanism are not accurately aligned.

Another object of my invention is to reduce the longitudinal space that is required for a heavy duty fuse device over that which is required when a conventional fuse device employing a tension spring is used.

Still another object of my invention is to provide for individually mounting a fuse device and its operating mechanism.

A further object of my invention is to provide for clamping a circuit interrupter in such manner as to permit substantial latitude in the positioning of it relative to its operating mechanism.

Still another object of my invention is to provide for withstanding comparatively high operating stresses that are imposed on the movable terminal of a high ampere capacity circuit interrupter of the solid material type.

Still another object of my invention is to provide for shunting the operating mechanism of a circuit interrupter of the fuse type during normal operation through the use of contact members that are separated shortly after the fuse blows.

Another object of my invention is to provide for shunting the operating mechanism during the cycle of circuit interruption and after the contact members, which are closed during normal operation, are opened.

A still further object of my invention is to minimize the flow of the products of the arc formed on blowing of a circuit interrupter of the solid arc extinguishing material type back past its main terminal.

A further object of my invention is to minimize the flow of the products of the arcs formed on blowing of a circuit interrupter of the solid arc extinguishing material type back past its main and auxiliary rod-like terminals.

Other objects of my invention will, in part, be obvious and in part appear hereinafter.

My invention, accordingly, is disclosed in the embodiments thereof shown in the accompanying drawings, and it comprises the features of construction, combination of elements and arrangement of parts which will be exemplified in the constructions hereinafter set forth, and the scope of the application of which will be indicated in the appended claims.

For a more complete understanding of the nature and scope of my invention, reference may be had to the following detailed description, taken in connection with the accompanying drawings, in which:

Figure 7 is a view, in front elevation, of the operating mechanism shown in Figure 3;

Figure 8 is a bottom plan view of the circuit interrupter shown in Figure 3;

Figure 9 is a detail sectional view showing how a condenser may be applied to the circuit interrupter shown in Figure 3;

Figure 10 is a detail sectional view, at an enlarged scale, of the resilient contact that may be employed in the mechanism shown in Figure 3 instead of the contact mechanism there shown;

Figure 11 is a view, partly in side elevation and partly in section, of another embodiment of my improved form of heavy duty circuit interrupter;

Figure 12 is a view, in front elevation, of the circuit interrupter shown in Figure 11;

Figure 13 is a view, partly in side elevation and partly in section, showing the crank arm that may be employed for cocking the operating mechanism of the circuit interrupter shown in Figure 11;

Figure 14 is a longitudinal sectional view of another form of replaceable fuse cartridge that may be employed in my improved form of heavy duty circuit interrupter;

Figure 15 is a top plan view of the fuse cartridge shown in Figure 14;

Figure 16 is a detail sectional view taken along the line 16—16 of Figure 14;

Figure 17 is a view, in side elevation, of one of the auxiliary terminals employed in the fuse cartridge shown in Figure 14;

Figure 18 is a view, in front elevation, of the auxiliary terminal shown in Figure 17;

Figure 19 is a detail sectional view taken along the line 19—19 of Figure 18;

Figure 20 is a detail sectional view, at an enlarged scale, taken along the line 20—20 of Figure 11;

Figure 21 is a perspective view of the cross-head and operating lever forming a part of the operating mechanism for the circuit interrupter shown in Figure 11;

Figure 22 is a cross-sectional view of one of the contact strips that are provided on the cross-head shown in Figure 21; and Figure 23 is a sectional view, at an enlarged scale, of the spring and contact assembly for the cross-head shown in Figure 21.

Figure 1:
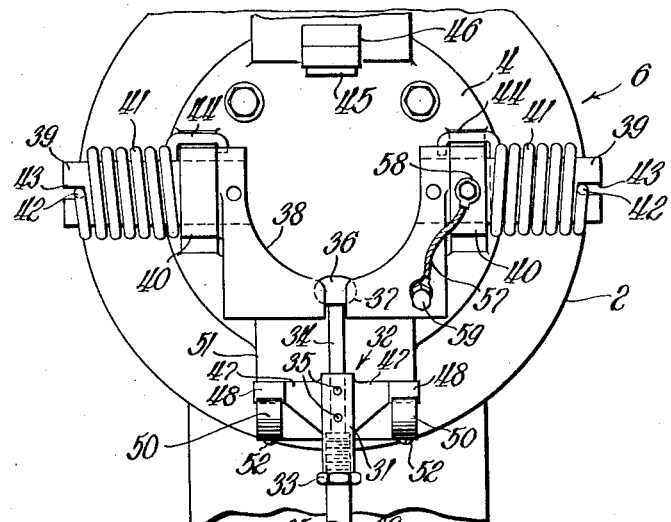
Figure 1 is a view, in front elevation, of one embodiment of my improved form of heavy duty circuit interrupter.
Figure 2:
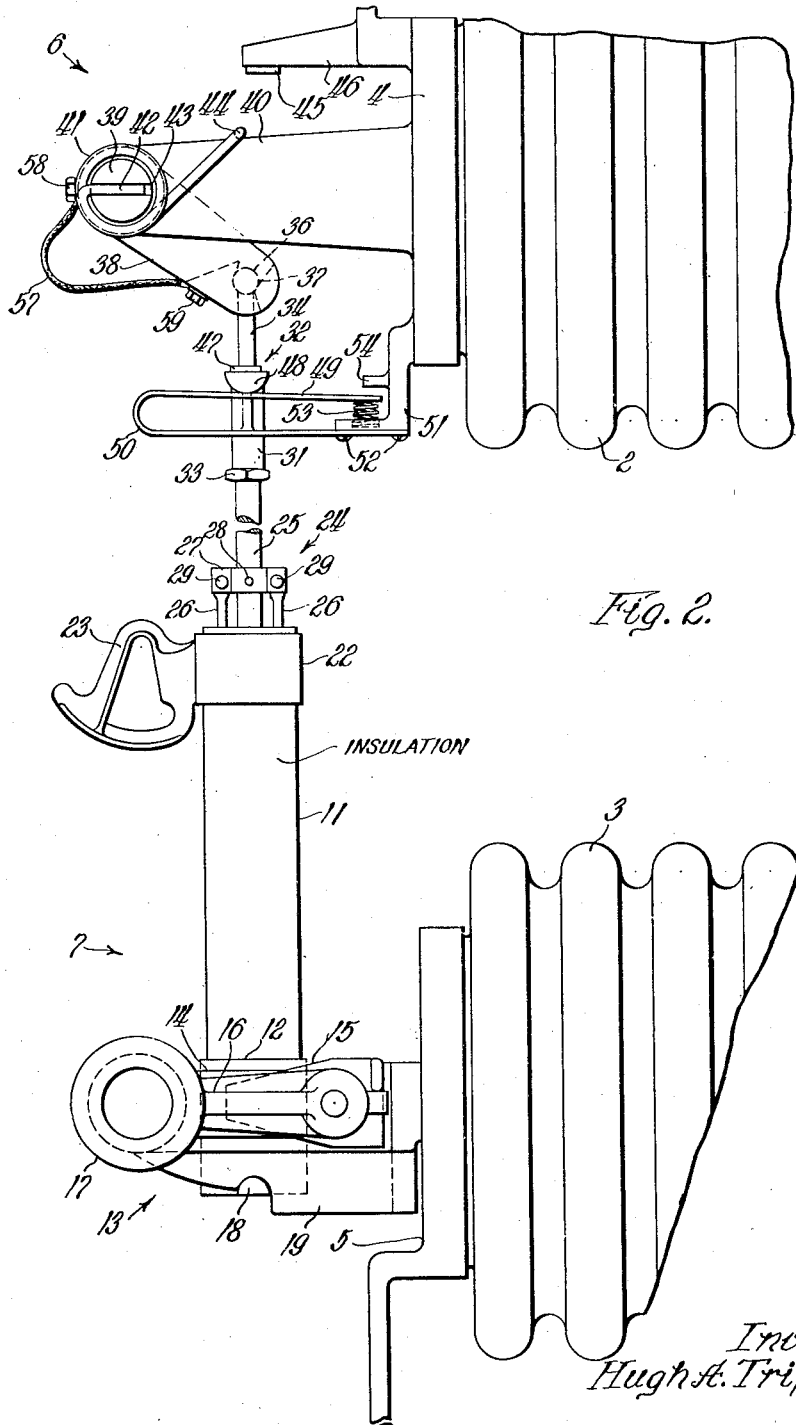
Figure 2 is a view, in side elevation, of the circuit interrupter shown in Figure 1.

Referring now particularly to Figures 1 and 2 of the drawings, it will be observed that the reference character 1 designates a base, such as a channel iron base, on the ends of which upper and lower insulators 2 and 3 are mounted. An upper line terminal 4 is mounted on the upper insulator 2 and a lower line terminal 5 is mounted on the lower insulator 3. It will be understood that the line terminals 4 and 5 are provided with suitable means, as illustrated, to permit connection of the circuit interrupter into an electric power line. An operating mechanism, shown generally at 6, is mounted on the upper line terminal 4 while the circuit interrupter itself, shown generally at 7, is mounted on the lower line terminal 5.

The details of construction of the circuit interrupter 7 will be set forth hereinafter. For present purposes it is sufficient to note that it comprises a tubular housing or fuse tube 11 having at its lower end a ferrule or terminal 12 that may be clamped to the lower line terminal 5 by a clamp mechanism, shown generally at 13. The clamp mechanism 13 is of the type shown in the co-pending application of Allan Ramsey, Serial No. 62,155, filed February 3, 1936, and assigned to the assignee of this application, now Patent No. 2,147,316. The clamp mechanism 13 comprises a contact clip 14 the upstanding arms of which engage the slabbed-off sides of the ferrule 12. The arms of the clip 14 are urged into contact engagement with the ferrule 12 by means of plates 15 that are cammed inwardly and outwardly on operation of an arm 16 having at its outer end an eye or socket 17 for receiving the hook of a switch-stick. At its lower end the ferrule 12 is provided with oppositely extending arms 18 for engaging suitable slotted openings in hook members 19 for holding the fuse tube 11 in place while it is being clamped by rotation of the arm 16. At its upper end the fuse tube 11 is provided with a ferrule 22 having integrally formed therewith an eye 23 for receiving the hook of a switch-stick. The eye 23 permits the operator to position the circuit interrupter 7 in position for re-fusing the device, as will be presently apparent.

Movably mounted within the tubular housing or fuse tube 11 is a terminal assembly shown generally at 24. The terminal assembly 24 comprises a main rod-like terminal 25 and a pair of auxiliary rod-like terminals 26. The terminals 25 and 26 are secured together for movement as a unit by means of a connecting member 27 that may be pinned at 28 to the main terminal 25 and secured by suitable screws 29 to the flattened ends of the auxiliary terminals 26.

The main and auxiliary terminals 25 and 26 are electrically connected to the ferrule or terminal 12 on the lower end of the tubular housing or fuse tube 11. The connection is effected by means of fusible and strain elements, as will appear hereinafter. It will be obvious that the tubular housing or fuse tube 11 and its associated parts constitute a replaceable fuse cartridge or refill unit which may be replaced, once it has operated, with a new unit.

The main rod-like terminal 25 is threaded into the central boss 31 of a cross-head illustrated generally at 32. A lock nut 33 is provided for securing the rod-like main terminal 25 in proper position with respect to the boss 31. A rod 34, secured by pins 35 to the cross-head 32, is provided with a ball 36 at its upper end for mounting in a ball socket 37 of a crank arm 38. It will now be apparent that the crank arm 38 and its associated parts constitute the operating mechanism illustrated generally at 6 and referred to briefly hereinbefore. The crank arm 38 is provided with oppositely extending trunnions 39 that are rockably mounted in upstanding bearing members 40 that may be integrally formed with the upper line terminal 4. Springs 41 coiled about the trunnions 39 serve to bias the crank arm 38 in such direction as to withdraw the terminal assembly 24 from the tubular housing or fuse tube 11. One end 42 of each of the coil springs 41 is inserted in the slotted outer end 43 of each of the trunnions 39 while the other end 44 is bent around the bearing members 40, as illustrated.

With a view to limiting the swing of the crank arm 38 during circuit interruption, a rubber bumper 45 is provided and is suitably mounted in a support member 46 that may be integrally formed with the upper line terminal 4.

As previously indicated, the circuit interrupter 7 is intended for normal operation in circuits carrying currents of the order of 400 to 1000 amperes. When such relatively high currents are carried, great care must be taken in order to prevent heating of any of the parts above certain predetermined limits. It is particularly desirable to provide a low resistance shunt circuit about the operating mechanism 6 in order to directly connect the main terminal 25 to the upper line terminal 4. For this purpose the cross-head 32 is provided with oppositely extending contact arms 47 having rounded contact engaging portions 48 at their outer ends which are arranged to have contact engagement with the resilient contact fingers 49 of stationary contact members 50. It will be noted that the stationary contact members 50 are generally of inverted U-shape and that they are secured to a suitable extension 51 from the upper line terminal 4 by screws 52. Each of the stationary contact members 50 is provided with a coil compression spring 53 to provide high pressure contact engagement with the rounded outer ends 48 of the contact arms 47. Stop members 54 extending outwardly from the extensions 51 serve to limit the upward movement of the resilient contact fingers 49 during circuit interruption.

During circuit interruption it will be understood that the terminal assembly 24 is moved upwardly under the influence of the coil springs 41. Contact engagement between the contact members 48 and 49 continues until the contact fingers 49 engage the stops 54. It will then be apparent that the shunt circuit around the operating mechanism 6 is no longer completed by the contact members 48 and 49. It is undesirable that the current being interrupted flow through the operating mechanism 6 during the remaining portion of the circuit interruption cycle. In order to avoid this, a flexible shunt 57 is connected, as illustrated, between the crank arm 38 and one of the bearing members 40. Screws 58 and 59 serve to secure the ends of the flexible lead 57 in contact engagement with the crank arm 38 and the bearing member 40, respectively. Obviously, two or more flexible shunts 57 may be employed, as desired. It will be understood that the flexible shunt or shunts 57 carries substantially the entire fault current during the portion of the interrupting cycle after the contact members 48 and 49 have been separated.

In describing the re-fusing of the apparatus shown in Figures 1 and 2 of the drawings, it will be understood that the crank arm will abut the bumper 45 prior to the insertion of the circuit interrupter 7 and its being placed in operative position. The hook of a switch-stick is inserted in the eye 23 and the circuit interrupter 7 with the cross-head 32 and rod 34 attached are lifted to such position that the ball 36 will be inserted in the socket 37 in the crank arm 38. The operator then pulls downwardly on the switch-stick to move the crank arm 38 against the biasing force of the coil springs 41 until the oppositely extending arms 18 have been placed in the downwardly opening slots in the hooks 19. The switch-stick is then removed from the eye 23 and its hook is inserted in the eye or socket 17 and the arm 16 is rotated to securely clamp the contact clip 14 into contact engagement with the ferrule or terminal 12. When the circuit interrupter 7 has been placed in operative position as described, the flexible contact fingers 49 of the stationary contact members 50 will be lifted off of the stops 54 so that comparatively high pressure contact engagement will be provided between the contact members 48 and 49. The circuit interrupter is now in condition to perform its intended function as and when necessary.

It will be observed that the crank arm 38 is pivoted about an axis that is further removed from the upper line terminal 4 than is the plane of movement of the main rod-like terminal 25. By thus positioning the axis about which the crank arm 38 rotates, it is possible to position the circuit interrupter 7 relatively closely to the lower line terminal 5 and at the same time have it located in the same plane as the upper line terminal 4. Because of the comparatively great stresses that are involved in the functioning of the heavy duty circuit interrupter shown in Figures 1 and 2 of the drawings, this arrangement has certain structural advantages. However, as will appear hereinafter, it is desirable to depart somewhat from this arrangement to obtain certain other advantages.

It will be seen that the circuit interrupter 7 is mounted as a unit on the lower line terminal 5 while the operating mechanism is mounted as a unit on the upper line terminal 4. During operation of the circuit interrupter, relatively severe pressures are developed therein. In the conventional type of circuit interrupter in which the operating mechanism and the fuse cartridge are all mounted within a single housing, considerable distortion of the spring often takes place. In such construction it is now conventional to use a coil tension spring. The convolutions of such a spring are often distorted by the intense pressures that are created on operation of the device. In some cases it is necessary to replace these springs as well as the fuse cartridge itself. By placing the operating mechanism on a separate terminal and entirely away from the pressures that may be created on operation of the circuit interrupter 7, the likelihood of distortion of the operating springs, such as the springs 41, is entirely avoided.

When the conventional type of circuit interrupter is employed in which a tubular housing is provided with terminals at its opposite ends, it is necessary that particular attention be paid to the stationary terminals in which the device is mounted in order to insure that they are in fairly close alignment. Such close alignment is unnecessary in the constructions disclosed herein. Considerable latitude is permitted in the alignment of the upper and lower line terminals 4 and 5, since the operating mechanism is mounted as a unit on one of them and the circuit interrupter is mounted as a unit on the other.

Figure 3:
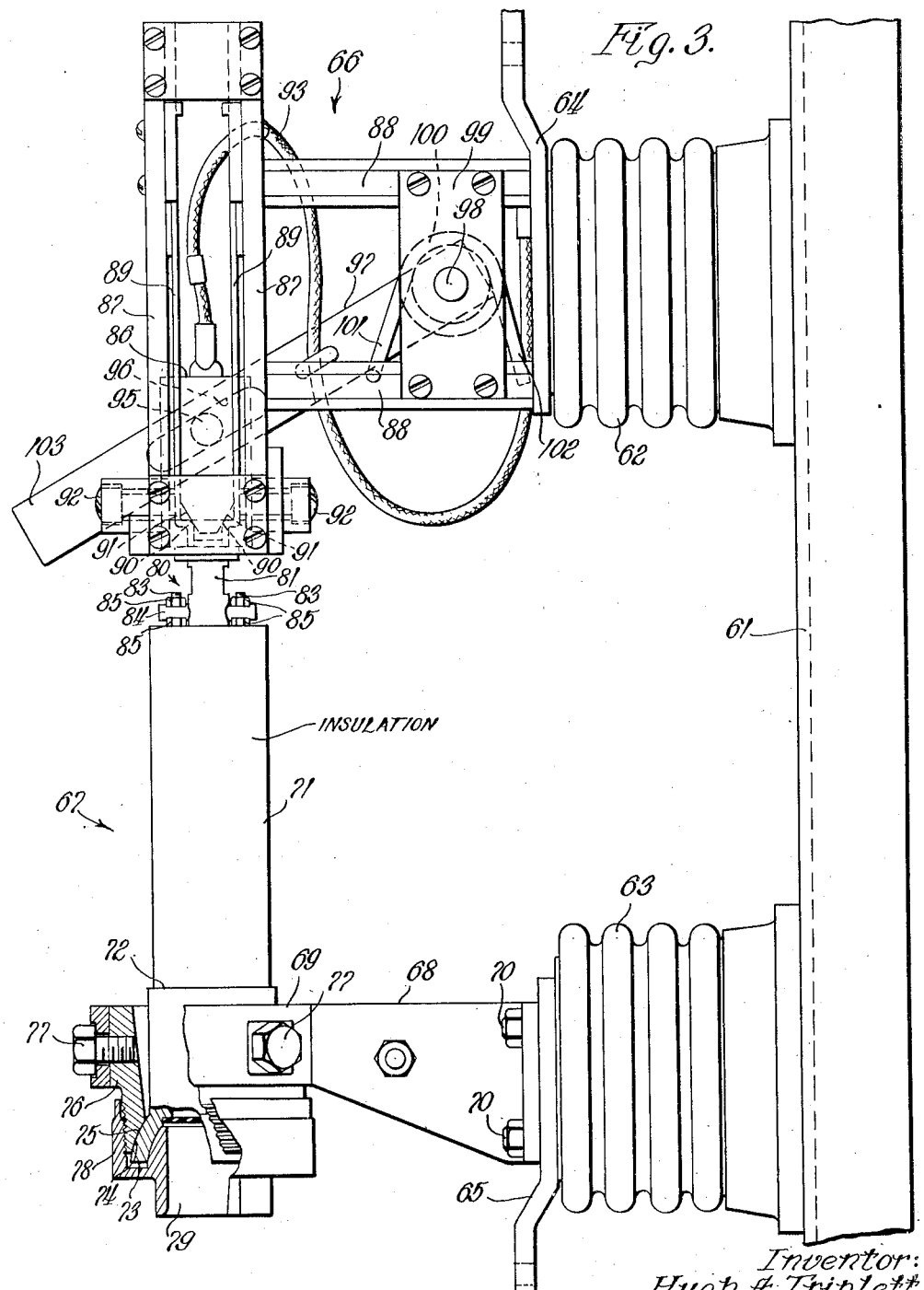
Figure 3 is a view, in side elevation, of another embodiment of my improved form of circuit interrupter, certain parts being broken away in order to more clearly illustrate the details of construction.

Another embodiment of my invention is shown in Figures 3, 7 and 8 of the drawings. As there illustrated, a base 61, such as a channel iron base, is provided having upper and lower insulators 62 and 63 mounted thereon for carrying upper and lower line terminals 64 and 65, respectively. As previously indicated, the line terminals are provided for connecting the device into a circuit, such as an alternating current power circuit in which the normal current flow may be of the order of 400 to 1000 amperes. For the reasons previously set forth, an operating mechanism, shown generally at 66, is mounted on the upper line terminal 64 while the circuit interrupter, shown generally at 67, is mounted on the lower line terminal 65.

For mounting the circuit interrupter 67, a support member 68 is provided that is generally inverted U-shape (Figure 8), with the outer end 69 generally circular and the inner end provided with outturned feet for receiving screws 70 to support the same on the lower line terminal 65. The circuit interrupter comprises a tubular housing or fuse tube 71 having a ferrule or terminal 72 at its lower end. Since it is desirable to permit considerable latitude in positioning of the circuit interrupter 67 relative to the operating mechanism 66 in order to avoid the requirement of accurate alignment therebetween in so far as the support therefor is concerned, a ball and socket joint is provided for mounting the circuit interrupter 67 on the support member 68. This ball and socket joint is provided in part by an extension 73 depending from the ferrule or terminal 72 which constitutes the ball member and has a convex spherical surface 74. A concave spherical surface 75 is provided in a socket member 76 that is generally circular in shape and secured to the circular portion 69 of the support member 68 by means of screws 77. A cap 78, having a downwardly opening discharge passageway 79, serves to clamp the ball and socket members 73 and 76 in the desired position with the spherical surfaces 74 and 75 in contact engagement. It will be understood that the ball and socket joint thus provided not only serves to variably position the circuit interrupter 67, but also it serves to conduct current from the ferrule or terminal 72 to the support member 68 and thence to the lower line terminal 65.

The circuit interrupter 67 is provided with a movable terminal assembly, shown generally at 80. It comprises a main terminal 81, the upper end of which is threaded, as indicated at 82 in Figure 4 of the drawings, and auxiliary terminals 83. The terminals 81 and 83 are rod-like in character. The auxiliary terminals 83 extend through a cross-member 84 that extends transversely through the main terminal 81 and they are adjustably secured by suitable nuts 85.

The operating mechanism 66 is provided for biasing the terminal assembly 80 to the open circuit position and for moving it to this position when the circuit interrupter 67 operates. For this purpose, the threaded end 82 of the main terminal 81 is threaded into a cross-head 86 the opposite arms of which are slidably mounted between two pairs of guide members 87. As shown, the guide members 87 are carried by suitable upright members 88 that are mounted on the upper line terminal 64. In order to shunt the operating mechanism 66 for the reasons set forth hereinbefore, flexible contact strips 89 are mounted on the inner sides of the guide members 87 and secured thereto at their upper ends. The lower ends 90 of the contact strips 89 are turned inwardly to provide small area high pressure contact engagement with the beveled lower end portions 91 of the cross-head 86. Adjusting screws 92 are provided on opposite sides of the guide members 87 for applying pressure to the contact strips 89.

A flexible shunt or cable 93 is provided for interconnecting the cross-head 86 and the upper line terminal 64. The flexible shunt 93 is provided, as previously described, for the purpose of carrying the fault current during the remainder of the cycle of operation of the circuit interrupter 67 after the cross-head 86 has moved out of contact engagement with the contact portions 90 of the contact fingers 89.

The cross-head 86 is provided with a transversely extending pin 95 that also extends through a slotted opening 96 in a lever 97 that is mounted for rotation with a shaft 98 that extends through bearing plates 99 carried by the upright members 88. A coil spring 100, having portions on opposite sides of the lever 97 as shown in Figure 7, serves to bias it for movement in a clockwise direction (Figure 3). The central portion 101 of the spring 100 is looped around the lever 97 while the convolutions are positioned about the shaft 98 with the end portions 102 bearing against the outer surface of the upper line terminal 64. The outer end 103 of the lever 97 extends well above the operating mechanism 66 in order to facilitate its being grasped by the hand of the operator for cocking the device.

Figure 4:
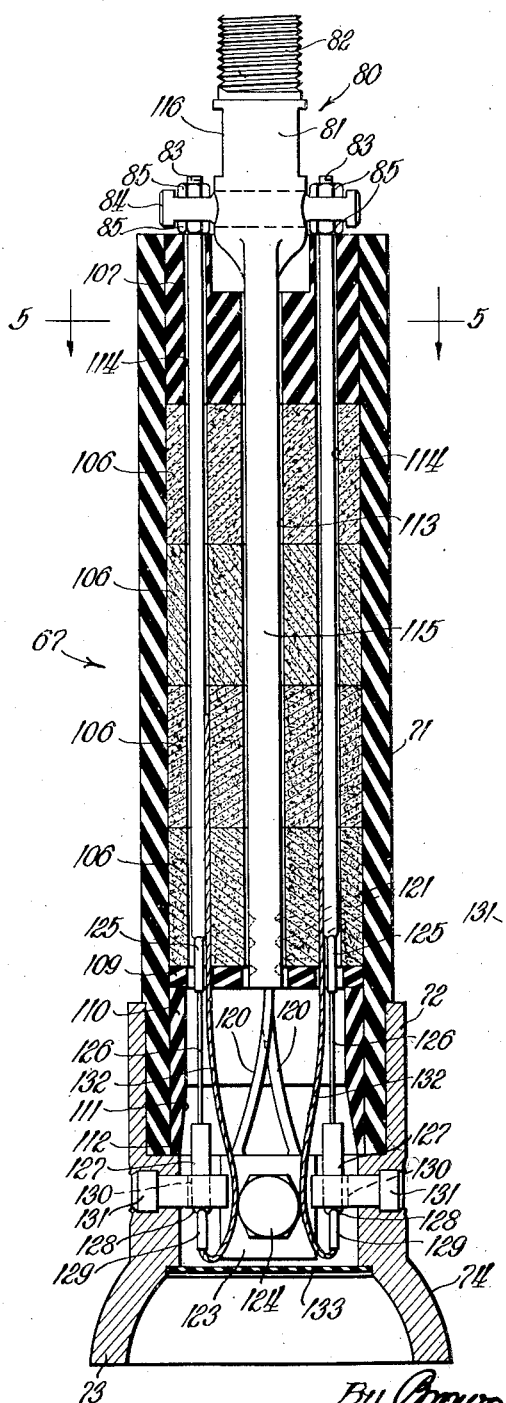
Figure 4 is a longitudinal sectional view of a replaceable fuse cartridge that may be employed in my improved heavy duty circuit interrupter.
Figure 5:
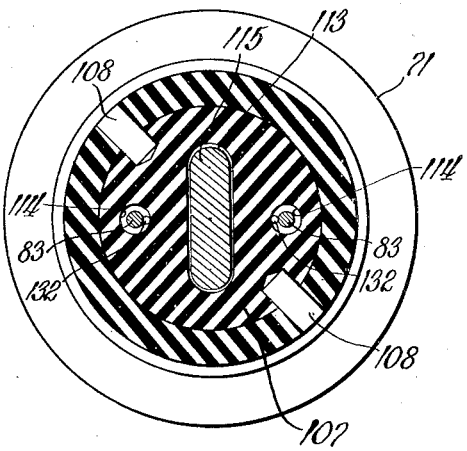
Figure 5 is a detail sectional view taken along the line 5—5 of Figure 4.
Figure 6:
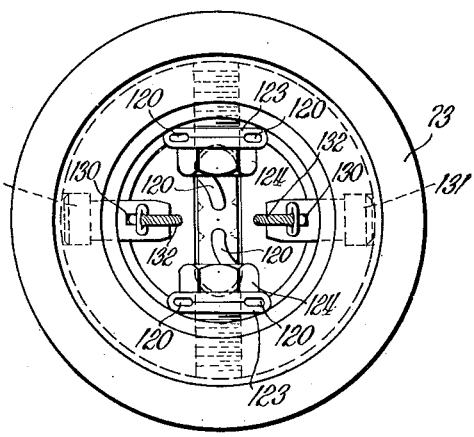
Figure 6 is a bottom plan view of the fuse cartridge shown in Figure 4.

The details of construction of the circuit interrupter 67 are illustrated more clearly in Figures 4, 5 and 6 of the drawings. It will be understood that the circuit interrupter 11, shown in Figures 1 and 2 of the drawings, may be of the same general character as that shown in Figures 4, 5 and 6, or it may be of the character of another embodiment of the circuit interrupter described hereinafter. The circuit interrupter 67 or replaceable fuse cartridge is somewhat similar in construction to that shown in my co-pending application, Serial No. 85,700, filed June 17, 1936, and assigned to the assignee of this application, now Patent No. 2,183,728.

As previously indicated, the circuit interrupter 67 is provided with a tubular housing or fuse tube 71. The fuse tube 71 is preferably formed of relatively rigid and strong insulating material such as a phenolic condensation product which is provided with a filling of solid arc extinguishing material, such as boric acid, which may be inserted as a single body or in several sections 106, as shown. At its upper end the fuse tube 71 is provided with a plug 107 of fiber or the like that is held in position by suitable dowel pins 108 (Figure 5). At its lower end the fuse tube 71 is provided with a retaining washer 109 and a sleeve 110, both preferably formed of fiber, with the sleeve 110 forming an arcing chamber with the lower end flared outwardly as indicated at 111. The lower end of the sleeve 110 abuts a shoulder 112 of the ferrule or terminal 72.

The solid arc extinguishing material 106, the plug 107, and the retaining washer 109 are provided with a centrally located main bore 113 and a pair of symmetrically disposed auxiliary bores 114. The auxiliary bores 114 are circular in cross-section, as shown in Figure 5, and are positioned on opposite sides of the main bore 113. By providing two auxiliary bores 114 and two auxiliary rod-like terminals 83, it is possible to provide a balanced construction in which the extremely high stresses imposed by the coil spring 100 may be resisted without permitting any binding action to take place while the terminal assembly 80 is being withdrawn from the fuse tube 71. As shown in Figure 5, the main bore 113 is generally oblong in shape for receiving a correspondingly shaped arcing terminal 115 which constitutes an extension of the main terminal 80.

In order to facilitate gripping the main terminal 80 and threading it into the cross-head 86, its opposite sides 116 are slabbed off to receive the jaws of a wrench.

At its lower end the main arcing terminal 115 is provided with a plurality of fusible elements 120. The fusible elements 120 are preferably formed of silver wire and their size and number depends upon the rating of the circuit interrupter 67. For purposes of illustration I have shown four fusible elements 120. The lower end of the main arcing terminal 115 is longitudinally drilled in order to receive one end of each of the fusible elements 120. The opposite sides of the lower end of the main arcing terminal 115 are then forced inwardly, as at 121, by a suitable tool, such as a punch, in order to hold the fusible elements 120 firmly in place in good electrical contact with the main arcing terminal 115. The lower ends of each pair of fusible elements 120 are secured in terminal sleeves 123 which are deformed thereon to provide proper electrical and mechanical connection. The terminal sleeves 123 are provided with centrally located apertures through which screws 124 may be inserted for clamping them in position on the inner surface of the ferrule or terminal 72.

It is desirable that no tension stress be applied to the fusible elements 120 in order that their time-current characteristics will be unaffected. The stress that would otherwise be applied thereto in opposing the biasing action of the spring 100 is transmitted through the auxiliary arcing terminals 83. At their lower ends, as indicated at 125, these auxiliary arcing terminals 83 are flattened onto strain elements 126 that may be formed of high strength wire such as nickel-chromium wire. The lower ends of the strain elements 126 are secured in the upper ends 127 of tubular terminals 128 that are flattened thereon. The lower ends 129 of the tubular terminals 128 are flattened at right angles to the upper portions 127 to provide for holding them in slotted openings 130 in inwardly extending pins 131. Flexible leads 132, formed preferably of insulated magnet wire, are secured in the deformed lower end portions 129 of the tubular terminals 128 and they extend considerable distances inside of the auxiliary bores 114. A disc 133, preferably formed of a suitable transparent material such as mica, serves to close the lower end of the ferrule or terminal 72.

On operation of the circuit interrupter 67, it will be understood that the fusible elements 120 are first melted, since they carry the major portion of the current. The entire flow of current is then transferred to the strain elements 126 which immediately melt. Since the flexible leads 132 extend into the auxiliary bores 114 a considerable distance, and further, since they are provided with a slight insulating coating such as an enamel coating, an arc or arcs are first formed within the auxiliary bores 114 and at some distance from their lower ends. In the event that the fault current is of comparatively low value, the arc or arcs may be extinguished within the auxiliary bores 114. It will be understood that, as soon as the strain elements 126 are released, the terminal assembly 80 is no longer restrained and begins to move upwardly, thereby withdrawing the main arcing terminal 115 and the auxiliary terminals 83 through their respective bores 113 and 114.

However, if the fault current is of such a value that it cannot be interrupted in the auxiliary bores 114, then an arc is formed in the main bore 113 between the main arcing terminal 115 and the ferrule or sleeve 72 or metal parts connected thereto. The large current arcs will then be extinguished in the main bore 113 by the evolution of water vapor in the now well-known manner.

The main bore 113 is generally oblong or rectangular in cross-section in order to provide additional space for the auxiliary bores 114 while still maintaining a sufficient body of the solid arc extinguishing material 106. The cross-sectional area of the auxiliary bores can then be increased to increase the range of interrupting capacity thereof.

It may be desirable to condense the products of the arc or arcs that are formed on blowing of the circuit interrupter 67. For this purpose the condenser, shown generally at 136 in Figure 9 of the drawings, may be employed. As there shown, a clamp nut 137 is substituted for the clamp nut 78, shown in Figure 3, and it has threaded thereon a metal sleeve or jacket 138 into the lower end of which a cap 139 is threaded. The cap 139 is provided with a discharge opening 140. Mounted on a pin 141 carried by the cap 139 is a series of perforated condenser plates 142. The arc gases pass through the perforations in the plates 142 and are cooled by the expansion thereof between these plates.

When the condenser 136 is provided at the lower end of the fuse tube 71, sufficient clearance must be provided between it and the lower line terminal 65. This is one of the reasons that the lever 97 is pivoted about an axis that is positioned between the plane of movement of the cross-head 86 and the upper line terminal 64.

In Figure 10 of the drawings an alternate form of contact construction is illustrated. The form of contact construction there shown may be substituted for that illustrated in Figures 3 and 7 of the drawings. The guide members 87 are provided with flexible contact fingers 145 on their inner sides which have inwardly projecting contact buttons 146. These buttons 146 may be formed by the properly shaped heads of silver rivets, as will be readily understood. The contact buttons 146 are arranged to engage suitable strips 147 of metal, such as silver, that are carried by the cross-head 86. The particular manner in which the strips 147 are secured to the cross-head 86 will be set forth hereinafter. Coil compression springs 148 serve to bias the resilient contact fingers 145 inwardly in order to provide high pressure contact engagement between the buttons 146 and the strips 147. The outer ends 149 of the flexible contact fingers 145 are curved toward each other, as illustrated, in order to limit their inward movement when the cross-head 86 is withdrawn.

Another embodiment of my invention is illustrated in Figures 11 through 23 of the drawings. Particular reference will first be had to Figures 11 and 12.

As shown in Figures 11 and 12, a base 155 is provided which may be a channel-iron base for carrying upper and lower insulators 156 and 157 thereon.

Mounted on the upper insulator 156 is a housing adapter 158 which is arranged to carry a housing 159 that has a line terminal member 160 extending therefrom. It will be understood that the housing 159 is provided for enclosing the operating mechanism for the circuit interrupter which will be presently described. It not only serves to enclose this mechanism but also provides a path for the flow of current to the line terminal 160. Because of this it is preferably formed of a good conducting metal, such as copper, brass, or aluminum.

On the lower insulator 157 an adapter 161 is provided having a line terminal extension 162. The adapter 161 is also provided with an outwardly extending support member 163 that is arranged to carry a circuit interrupter, shown generally at 164. The circuit interrupter 164 is provided with a tubular housing or fuse tube 165 having at its lower end a ferrule or terminal 166. It is desirable to mount the circuit interrupter 164 so that it will have some latitude of movement relative to its operating mechanism for the reasons previously set forth. For this purpose a ball and socket supporting structure is provided which is similar to that illustrated in Figure 3 of the drawings and described hereinbefore. As shown in Figure 11, the ferrule or terminal 166 is provided with a ball member 167 the outer surface 168 of which is convex and spherical for engaging a concave spherical surface 169 of a cylindrical extension 170 of the support member 163. A clamp nut 171 serves to secure the spherical surfaces 168 and 169 in good contact engagement and to securely hold the circuit interrupter 164 in place on the support member 163. The clamp nut 171 is provided with a downwardly extending vent 172 through which the products of the arc or arcs may flow. If desired, a condenser, such as the condenser 136 shown in Figure 9 of the drawings and previously described, may be employed for cooling and condensing the products of the arcs. The clamp nut 171 is provided with spaced-apart ridges 173 to facilitate grasping of the same for mounting the circuit interrupter 164 in place or removing it therefrom.

The circuit interrupter 164 is provided with a main terminal 176 and a pair of auxiliary terminals 177, both the main and auxiliary terminals being rod-like in character. The auxiliary terminals 177 are secured to a yoke or evener 178 that is pinned at 179 to the main terminal 176. Screws 180 extending through the two members forming the yoke or evener 178, Figure 15, serve to hold the auxiliary terminals 177 thereto.

The upper end of the main terminal 176 is threaded into a boss 181 of a cross-head shown generally at 182 that is slidably mounted in a housing spacer 183 that is carried by the housing 159 and spaces a cover 183' therefrom. The cross-head 182 is provided with a transversely extending pin 184 which also extends through the slotted opening 185 in a lever 186 that is mounted on a shaft 187 which is rockably mounted in the sides of the housing 159 with its ends projecting therefrom. The lever 186 is biased to retrieve the cross-head 182 and the associated main and auxiliary terminals 176 and 177 by means of a spring 188, a section of which is positioned on each side of the lever 186. The central portion 189 of the spring is looped around the lever 186, while the end portions 190 bear against a partition 191 in the housing 159. It will be observed that the lever 186 is arranged to rock through the angle indicated by the arc 192 in moving from and to the circuit closed position. A flexible shunt 193, formed by a plurality of flexible laminations of copper, is provided for interconnecting the cross-head 182 and the under side of a flange 194 of the housing 159.

The ends of the shaft 187 are provided with transversely extending pins 197. The right-hand pin 197 may be engaged by a crank arm 198 (Figure 13), for rotating the shaft 187 to cock the device. The crank arm 198 is provided with a socket 199 for slipping over the end of the shaft 187 and it is provided with inclined slots 200 for engaging the pin 197.

The details of construction of the circuit interrupter 164 which in reality is a replaceable fuse cartridge are more clearly illustrated in Figures 14 through 19 of the drawings. Referring particularly to Figure 14, it will be observed that the tubular housing or fuse tube 165 constitutes a relatively thin shell. It is preferably formed of a phenolic condensation product and is provided with a liner 204 that may be formed of fiber. Inside the liner 204 a filling of a solid arc extinguishing material, such as boric acid, is provided in a plurality of sections 205. A plug 206, preferably formed of fiber, is threaded into the fiber liner 204, as shown, at the upper end of the housing. A retaining ring 207, also preferably formed of fiber, is provided below the lower section 205 of the solid arc extinguishing material for holding it in place. The sections of solid arc extinguishing material 205, the plug 206, and the retaining ring 207 are provided with a centrally located main bore 208 and a pair of auxiliary bores 209 for receiving the main and auxiliary terminals 176 and 177, respectively. The main and auxiliary terminals 176 and 177 are rod-like in character and circular in cross-section. The diameters of their respective bores 208 and 209 are such that only sufficient clearance is provided to permit the terminals to be freely withdrawn therethrough. In other words, the main and auxiliary terminals 176 and 177 substantially fill their respective bores 208 and 209 so that relatively little, if any, of the products of the arc or arcs formed on operation of the circuit interrupter 164 are permitted to flow back therethrough past the terminals 176 and 177.

With a view to further preventing the backward flow of the products of the arcs past the main terminal 176, a packing is provided at the upper end of the bore 208. As illustrated, the bore 208 is enlarged as indicated at 210 for receiving several layers of chevron packing 211 which may be positioned on top of a spreader ring 212. A compression ring 213 is positioned on top of the upper layer of packing 211 and a gland 214, preferably formed of a phenolic condensation product, is threaded into the threaded upper end of the enlarged recess 210 in the fiber plug 206. The gland 214 is screwed downwardly sufficiently far to compress the layers of packing 211 and to move them into pressure-tight engagement with the cylindrical main terminal 176. However, it is only tightened sufficiently far to provide this pressure-tight relation without substantially preventing the main terminal 176 from being freely withdrawn through the main bore 208.

It will be observed that the layers of chevron packing 211 are so disposed that opposition to the flow of gas in the direction of movement of the terminal 176 increases as the gas pressure in the main bore 208 increases. While this tends to retard the movement of the terminal 176 somewhat, it will be understood that it is permissible since, under such conditions, a relatively great pressure is exerted on the lower end of the terminal 176 by the gases evolved under heavy overload conditions. If desired, the auxiliary terminals 177 may be provided with chevron packing as is the main terminal 176, for the same purpose. However, it will not ordinarily be necessary to provide this additional packing.

With a view to facilitating the outward flow of the products of the arc or arcs, the lower ends of the main and auxiliary bores 208 and 209 are flared outwardly as shown at 218 and 219, respectively.

The main terminal 176 is provided at its lower end with a plurality of fusible elements 220. Preferably, the fusible elements 220 are formed of silver wire and, as previously indicated, their number and size will depend upon the rating of the circuit interrupter 164. For illustrative purposes, four fusible elements 220 have been shown. The lower ends of the fusible elements 220 are secured in a terminal sleeve 223 that is deformed thereon. The terminal sleeve 223 is provided with a suitable aperture through which a screw 224 may be placed for securing it in good contact engagement with the inner surface of the ferrule or terminal 166.

Strain elements 225, preferably formed of nickel-chromium alloy, are provided for restraining the auxiliary terminals 177 and for relieving the fusible elements 220 of stress that would otherwise be imposed thereon. As shown more clearly in Figures 17, 18 and 19 of the drawings, the ends 226 of the strain element 225 are corrugated to facilitate holding of the same. The lower end of the auxiliary terminal 177 is provided with a suitable longitudinally extending aperture into which the upper end 226 of the strain element 225 may be inserted. As indicated at 227, the lower end of the auxiliary terminal 177 is deformed onto the upper end 226 of the strain element 225 so that it is mechanically held in place and, at the same time, good electrical contact is provided therewith. The upper end of the auxiliary terminal 177 is flattened as indicated at 228 and is provided with an aperture 229 through which the screw 180 may be placed. The lower end of the strain element 225 is positioned in the upper end 230 of a sleeve 231. The end 230 is then deformed onto the corrugated lower end 226 for providing mechanical and electrical connection thereto. The lower end 232 of the sleeve 231 is deformed at right angles to the other end 230 for positioning across a slotted opening 233 in a pin 234, Figure 14, which extends inwardly from the ferrule or terminal 166. It will be noted that two pins 234 are provided, one for each of the auxiliary terminals 177. After the upper end portions 230 of the sleeves 231 have been positioned in the slots 233 in the pins 234, the ends thereof are closed to prevent disengagement thereof.

The lower end of the ferrule or terminal 166 is closed by a disc 235 that is preferably formed of transparent material such as mica.

It will be noted that the upper end of the main terminal 176 is threaded at 238 for insertion in the boss 181 of the crosshead 182. A lock nut 239 is provided for holding the main terminal 176 in position once it has been set in place. The opposite sides of the main terminal 176 are slabbed off, as indicated at 240, to facilitate the engagement of the jaws of a wrench for turning it into place.

In Figures 20 and 21 of the drawings, the details of construction of the operating mechanism and the cross-head 182 are more clearly illustrated. It will be observed that the cross-head 182 is provided with a central rectangular portion 244 that is provided with machined surfaces 245 on opposite sides and ends for sliding between the machined surfaces of guide members 246 formed by flanges integral with the housing 159 and cover 183'. This construction serves to guide the crosshead 182 in its movement during operation of the circuit interrupter 184.

The cross-head 182 is also provided with oppositely extending arms 247 which carry contact strips 248. Two of the strips 248 are positioned on each arm 247, as shown, and are held in place by transversely extending rivets 249. As shown in Figure 22, the contact strips 248 are each provided with an inlaid contact strip 250. The strip 248 really constitutes a backing strip and is preferably formed of copper, while the inlaid strip 250 is preferably formed of silver. The silver strip 250 may be secured in the backing strip 248 by any suitable means, such as by rolling, or a combination of rolling and fusion. In addition to the rivets 249 strips 248 are soldered or brazed to the surface of the arms 247 to provide intimate contact engagement therebetween.

In order to provide for contact engagement with the silver strips 250, contact fingers 251 are mounted within the housing spacer 183 on the housing 159 and the cover 183'. The contact fingers 251 are formed of good conducting material such as copper and each is provided with a contact button 252 formed by the head of a rivet, preferably composed of silver, which, as shown in Figure 23 of the drawings, extends entirely therethrough and is headed over on each side. Coil compression springs 253 are mounted in suitable bosses in the housing 159 in the cover 183', as more clearly shown in Figure 11 of the drawings, and they are positioned in axial alignment with the contact buttons 252. Cap screws 254 are threaded in suitable apertures in the bosses integrally formed with the housing 159 and cover 183' for holding the coil compression springs 253 in operative position. The inward movement of the outer ends of the contact fingers 251 is limited by the inturned portions 255 which prevent movement under the influence of the springs 253 beyond a predetermined extent when the cross-head 182 is moved to the open circuit position.

The cover 183' is provided with an opening on its upper side that is closed by a cover plate 256. The cover plate 256 may be held in position by screws 257 which may be readily removed to permit inspection of the operating mechanism inside of the housing 159.

In order to load the device, the circuit interrupter or replaceable fuse cartridge 164 is inserted through the socket 170 and at the same time the crank arm 198 is placed on the shaft 187 and rotated to bring the cross-head 182 to the position shown in Figure 11 of the drawings. While the cross-head 182 is held in this position, the cartridge 164 is rotated to thread the main terminal 176 into the boss 181. The lock nut 239 is then tightened and the crank arm 198 is released and removed. Because of the ball and socket mounting of the terminal or ferrule 166, no particular care need be paid to carefully aligning the circuit interrupter 164 with its operating mechanism. Once the cartridge 164 has been placed in position, and the crank arm 198 released, the clamp nut 171 is threaded into place to securely clamp the spherical contact surfaces 168 and 169 into contact engagement.

On operation of the circuit interrupter 164, the fusible elements 220 (Figure 14), are first melted, whereupon the entire flow of current is transferred to the strain elements 225, which melt and form an arc or arcs between the auxiliary terminals 177 and the corresponding portions 230 of the sleeves 231. If the fault current is comparatively slight, the arc or arcs formed will be drawn and entirely extinguished in one or both of the auxiliary bores 209. However, if the fault current to be interrupted is outside of the range of the auxiliary bores 209, then an arc will strike between the main terminal 176 and the terminal or ferrule 166, or some of its inwardly projecting parts, and will be drawn into the main bore 208 on continued movement of the main terminal 176 therethrough, where it will be extinguished due to the evolution of water vapor from the walls thereof.

While the device is carrying normal line current, the operating mechanism is shunted by the contact fingers 251 and the contact buttons 252 carried thereby which engage the silver strips 250 in the contact strips 248. Since the contact fingers 251 are secured to the housing 159 and to the cover 183', which are preferably formed of good conducting material, such as red brass castings, a low resistance path is provided to the line terminal 160. This path is maintained by the flexible shunt 193 during the cycle of circuit interruption and after the arms 247 of the crosshead 182 have been moved out of engagement with the contact buttons 252. Thus, there is never any time during which appreciable amounts of current are required to be carried by the operating mechanism.

Since certain further changes may be made in the foregoing constructions, and different embodiments of the invention may be made without departing from the scope thereof, it is intended that all matter described hereinbefore or shown in the accompanying drawings shall be interpreted as illustrative and not in a limiting sense.

I claim as my invention:

1. A circuit interrupter comprising, in combination, a tubular housing, a pair of terminals between which an arc is adapted to be formed one being stationarily mounted with respect to said tubular housing and the other being movably mounted therein, the movable terminal including a main conductor and a plurality of auxiliary conductors, connected in parallel circuit relation with said main conductor, solid arc extinguishing material in said tubular housing having openings therethrough each individual to one of said conductors, relatively large current arcs being more readily extinguished in the opening occupied by said main conductor and relatively small current arcs being more readily extinguished in the openings occupied by said auxiliary conductors, fusible means interconnecting said stationarily mounted terminal and said main and auxiliary conductors of said movable terminal and restraining movement of the latter until the fusible means blows on the occurence of a predetermined overload, and mechanism operatively connected to said movable terminal for retracting it from said stationary terminal when said fusible means blows.

2. A circuit interrupter comprising, in combination, first and second insulators, a tubular housing carried by said first insulator, a pair of terminals between which an arc is adapted to be formed one being stationarily mounted with respect to said tubular housing and the other being movably mounted therein, the movable terminal including a main rod-like conductor having a relatively large current carrying section and a plurality of auxiliary rod-like conductors each having a relatively small current carrying section connected in parallel circuit relation with said main rod-like conductor, solid arc extinguishing material in said tubular housing having openings therethrough each individual to one of said conductors and correspondingly proportioned, relatively large current arcs being more readily extinguished in the opening occupied by said main rod-like conductor and relatively small current arcs being more readily extinguished in the openings occupied by said auxiliary rod-like conductors, fusible means interconnecting said stationarily mounted terminal and said main and auxiliary conductors of said movable terminal and restraining movement of the latter until the fusible means blows on the occurrence of a predetermined overload, and a mechanism carried by said second insulator and operatively connected to said movable terminal for retracting it from said stationary terminal when said fusible means blows.

3. A circuit interrupter comprising, in combination, a tubular housing, a pair of terminals between which an arc is adapted to be formed one being stationarily mounted with respect to said tubular housing and the other being movably mounted therein, mechanism operatively connected to the movable terminal for withdrawing it from the stationary terminal for extingushing the arc therebetween, insulator means, universal clamp means for detachably mounting said tubular housing on said insulator means and permitting substantial latitude in the positioning of the former with respect to the latter, and means for mounting said mechanism on said insulator means in spaced relation to said tubular housing.

4. A circuit interrupter comprising, in combination, a tubular housing, a pair of terminals between which an arc is adapted to be formed one being stationarily mounted with respect to said tubular housing and the other being movably mounted therein, mechanism operatively connected to the movable terminal for withdrawing it from the stationary terminal for extinguishing the arc therebetween, insulator means, ball and socket clamp means for detachably mounting said tubular housing on said insulator means, and means for mounting said mechanism on said insulator means in spaced relation to said tubular housing.

5. A circuit interrupter comprising, in combination, first and second insulators, universal clamp means carried by said first insulator, a tubular housing detachably mounted on said first insulator by said universal clamp means, a pair of terminals between which an arc is adapted to be formed one being stationarily mounted with respect to said tubular housing and the other being movably mounted therein, and a mechanism carried by said second insulator and operatively connected to the movable terminal for withdrawing it from the stationary terminal for extinguishing the arc therebetween.

6. A circuit interrupter comprising, in combination, first and second insulators, manually operable universal clamp means carried by said first insulator, a tubular housing detachably mounted on said first insulator by said clamp means and extending toward said second insulator, said manually operable universal clamp means being arranged and adapted to permit substantial latitude in the positioning of said tubular housing with respect to said first and second insulators, a pair of terminals between which an arc is adapted to be formed one being stationarily mounted with respect to said tubular housing and the other being movably mounted therein, and a mechanism carried by said second insulator and operatively connected to the movable terminal for withdrawing it from the stationary terminal for extinguishing the arc therebetween.

7. A circuit interrupter comprising, in combination, first and second insulators, socket means carried by said first insulator, a tubular housing extending toward said second insulator and having ball means thereon for interfitting with said socket means, clamp means for holding said ball and socket means in juxtaposed relation, a pair of terminals between which an arc is adapted to be formed one being stationarily mounted with respect to said tubular housing and the other being movably mounted therein, and a mechanism carried by said second insulator and operatively connected to the movable terminal for withdrawing it from the stationary terminal for extinguishing the arc therebetween.

8. A circuit interrupter comprising, in combination, first and second line terminals, means for mounting said line terminals in insulated spaced relation, a tubular housing mounted on said first line terminal, a pair of arcing terminals one being stationarily mounted with respect to said tubular housing and connected to said first line terminal and the other being movably mounted in said tubular housing, mechanism mounted on said second line terminal and operatively connected to the movable arcing terminal for retracting it from the stationary arcing terminal and providing a circuit between said movable arcing terminal and said second line terminal, and contact means interconnecting said movable arcing terminal and said second line terminal and shunting said circuit through said mechanism in the closed position, said contact means being opened on operation of said movable arcing terminal to the open circuit position.

9. A circuit interrupter comprising, in combination, first and second line terminals, means for mounting said line terminals in insulated spaced relation, a tubular housing mounted on said first line terminal, a pair of arcing terminals one being stationarily mounted with respect to said tubular housing and connected to said first line terminal and the other being rod-like in character and movably mounted in said tubular housing, a lining of solid arc extinguishing material in said tubular housing from which an arc extinguishing medium is evolved due to the heat of the arc drawn between said arcing terminals, mechanism mounted on said second line terminal and operatively connected to said movable rod-like arcing terminal for retracting it from the stationary arcing terminal, contact arms extending from opposite sides of said rod-like arcing terminal, and resilient contact means carried by and electrically connected to said second line terminal and positioned in contact engagement with said contact arms when said rod-like arcing terminal is in the closed circuit position.

10. A circuit interrupter comprising, in combination, first and second line terminals, means for mounting said line terminals in insulated spaced relation, a tubular housing mounted on said first line terminal, a pair of arcing terminals one being stationarily mounted with respect to said tubular housing and connected to said first line terminal and the other being movably mounted in said tubular housing, mechanism mounted on said second line terminal and operatively connected to the movable arcing terminal for retracting it from the stationary arcing terminal, contact means interconnecting said movable arcing terminal and said second line terminal, said contact means being opened on operation of said movable arcing terminal to the open circuit position, and flexible conductor means also interconnecting said movable arcing terminal and said second line terminal and adapted to carry the entire line current during operation of the interrupter after opening of said contact means.

11. A circuit interrupter comprising, in combination, first and second line terminals, means for mounting said line terminals in insulated spaced relation, a tubular housing mounted on said first line terminal, a pair of arcing terminals one being stationarily mounted with respect to said tubular housing and connected to said first line terminal and the other being rod-like in character and movably mounted in said tubular housing, a lining of solid arc extinguishing material in said tubular housing from which an arc extinguishing medium is evolved due to the heat of the arc drawn between said arcing terminals, mechanism mounted on said second line terminal and operatively connected to said movable rod-like arcing terminal for retracting it from the stationary arcing terminal, contact arms extending from opposite sides of said rod-like arcing terminal, resilient contact means carried by and electrically connected to said second line terminal and positioned in contact engagement with said contact arms when said rod-like arcing terminal is in the closed circuit position, and flexible conductor means interconnecting said rod-like arcing terminal and said second line terminal and adapted to carry the entire line current during operation of the interrupter after separation of said contact arms from said resilient contact means.

12. A circuit interrupter comprising, in combination; a renewable fuse cartridge including a fuse tube, a stationary terminal at one end of said fuse tube, a movable terminal within said fuse tube, and fusible means interconnecting said terminals; mechanism detachably connected to said movable terminal for retracting it from said stationary terminal on blowing of said fusible means, insulator means, universal means for removably clamping said renewable fuse cartridge to said insulator means, and means for mounting said mechanism on said insulator means in spaced relation to said renewable fuse cartridge.

13. A circuit interrupter comprising, in combination, first and second line terminals, means for mounting said line terminals in insulated spaced relation, a renewable fuse cartridge including a fuse tube, a stationary arcing terminal at one end of said fuse tube, a movable arcing terminal within said fuse tube, and fusible means interconnecting said terminals; universal means for removably clamping said stationary arcing terminal to said first line terminal, lever means pivoted on said second line terminal and detachably connected to said movable arcing terminal for retracting it from said stationary terminal on blowing of said fusible means, and spring means carried by said second line terminal and biasing said lever means to the open circuit position.

14. A circuit interrupter comprising, in combination, first and second line terminals, means for mounting said line terminals in insulated spaced relation; a renewable fuse cartridge including a fuse tube, a stationary arcing terminal at one end of said fuse tube, a rod-like movable arcing terminal within said fuse tube and extending out of its other end, fusible means interconnecting said terminals, and a lining of solid arc extinguishing material within said fuse tube from which an arc extinguishing medium is evolved due to the heat of the arc formed on blowing of said fusible means; means for removably clamping said stationary arcing terminal to said first line terminal, lever means pivoted on said second line terminal and detachably connected to said movable arcing terminal for retracting it from said stationary terminal on blowing of said fusible means, coil spring means disposed about the axis of rotation of said lever means and biasing the same to the open circuit position, cross-head contact means connected to said rod-like movable arcing terminal and extending in diametrically opposite directions from its longitudinal axis, and resilient contact means carried by and electrically connected to said second line terminal and positioned on opposite sides of said axis of said movable arcing terminal in contact engagement with said cross-head contact means as long as said fusible means remains intact, said cross-head contact means being out of engagement with said resilient contact members when the interrupter is in the open circuit condition.

15. A circuit interrupter comprising, in combination, first and second line terminals, means for mounting said line terminals in insulated spaced relation; a renewable fuse cartridge including a fuse tube, a stationary arcing terminal at one end of said fuse tube, a rod-like movable arcing terminal within said fuse tube and extending out of its other end, fusible means interconnecting said terminals, and a lining of solid arc extinguishing material within said fuse tube from which an arc extinguishing medium is evolved due to the heat of the arc formed on blowing of said fusible means; means for removably clamping said stationary arcing terminal to said first line terminal, lever means pivoted on said second line terminal and detachably connected to said movable arcing terminal for retracting it from said stationary terminal on blowing of said fusible means, coil spring means disposed about the axis of rotation of said lever means and biasing the same to the open circuit position, cross-head contact means connected to said rod-like movable arcing terminal and extending in diametrically opposite directions from its longitudinal axis, resilient contact means carried by and electrically connected to said second line terminal and positioned on opposite sides of said axis of said movable arcing terminal in contact engagement with said cross-head contact means as long as said fusible means remains intact, said cross-head contact means being out of engagement with said resilient contact members when the interrupter is in the open circuit condition, and flexible conductor means connected in shunt circuit relation with said contact means and adapted to carry the entire line current during blowing of said fusible means after separation of said contact means.

16. A circuit interrupter comprising, in combination, insulating support means, a tubular housing carried by said insulating support means, a pair of arcing terminals one being stationarily mounted with respect to said tubular housing and the other being movably mounted therein, lever means operatively connected to the movable terminal for retracting it from the stationary terminal, means pivotally mounting said lever means on said insulating support means on the side of said tubular housing away from said support means, and spring means biasing said lever means to the open circuit position.

17. A circuit interrupter comprising, in combination, insulating support means, a fuse tube, means for detachably clamping said fuse tube to said support means, a pair of arcing terminals one being fixed to one end of said fuse tube and the other being movable through the other end of said fuse tube, lever means pivoted on said support means about an axis on the side of said fuse tube away from said support means, means for detachably interconnecting the movable arcing terminal and said lever means, and spring means cooperating with said lever means to bias said arcing terminals apart.

18. A circuit interrupter comprising, in combination, insulating support means, a fuse tube, means for detachably clamping said fuse tube to said support means, a pair of arcing terminals one being fixed to one end of said fuse tube and the other being movable through the other end of said fuse tube, lever means pivoted on said support means about a point spaced further away therefrom than is said fuse tube, means for detachably interconnecting the movable arcing terminal and said lever means, spring means cooperating with said lever means to bias said arcing terminals apart, and means for receiving and holding said fuse tube in a predetermined position after said movable arcing terminal has been attached to said lever means to permit operation of said means for clamping said fuse tube to said support means.

19. A circuit interrupter comprising, in combination, a base member, a pair of insulators positioned in spaced relation on said base member, a line terminal at the outer end of each insulator, a fuse tube, a terminal fixed to one end of said fuse tube, means on one line terminal for detachably clamping to said fixed terminal and holding said fuse tube substantially parallel to said base and extending toward the other line terminal, rod-like terminal means movable in said fuse tube through its other end away from said fixed terminal, lever means detachably connected to said rod-like terminal means, means pivotally mounting said lever means on the other line terminal at a point on the side of the plane of said rod-like terminal means away from said other line terminal, and spring means biasing said lever means for retracting said rod-like terminal means from said fixed terminal.

20. A circuit interrupter comprising, in combination, a base member, a pair of insulators positioned in spaced relation on said base member, a line terminal at the outer end of each insulator, a fuse tube, a terminal fixed to one end of said fuse tube, means on one line terminal for detachably clamping to said fixed terminal and holding said fuse tube substantially parallel to said base and extending toward the other line terminal, rod-like terminal means movable in said fuse tube through its other end away from said fixed terminal, lever means detachably connected to said rod-like terminal means, means pivotally mounting said lever means on the other line terminal at a point on the side of the plane of said rod-like terminal means away from said other line terminal, spring means biasing said lever means for retracting said rod-like terminal means from said fixed terminal, and cooperating contact means on said rod-like terminal means and on said other line terminal for interconnecting the same and shunting said lever means.

21. A circuit interrupter comprising, in combination, a base member, a pair of insulators positioned in spaced relation on said base member, a line terminal at the outer end of each insulator, a fuse tube, a terminal fixed to one end of said fuse tube, means on one line terminal for detachably clamping to said fixed terminal and holding said fuse tube substantially parallel to said base and extending toward the other line terminal, rod-like terminal means movable in said fuse tube through its other end away from said fixed terminal, lever means detachably connected to said rod-like terminal means, means pivotally mounting said lever means on the other line terminal at a point on the side of the plane of said rod-like terminal means away from said other line terminal, spring means biasing said lever means for retracting said rod-like terminal means from said fixed terminal, cooperating contact means on said rod-like terminal means and on said other line terminal for interconnecting the same and shunting said lever means, said contact means being arranged and adapted to be opened on movement of said rod-like terminal means to a predetermined position during operation of the circuit interrupter, and flexible conductor means interconnecting said lever means and said other line terminal and adapted to carry the line current after separation of said contact means.

22. The combination with a circuit interrupter having separable terminals for interconnecting a pair of line terminals, of mechanism mounted on one line terminal and operatively connected to one of said separable terminals for separating the same and providing a circuit between said one line terminal and said one separable terminal, cross-head means connected to said one separable terminal and movable therewith, and resilient contact means carried by said one line terminal and cooperating with said cross-head means to provide a shunt circuit around said circuit through said mechanism when the circuit interrupter is in the closed circuit position.

23. The combination with a circuit interrupter having separable terminals for interconnecting a pair of line terminals, of mechanism mounted on one line terminal and operatively connected to one of said separable terminals for separating the same, cross-head means connected to said one separable terminal and movable therewith, resilient contact means carried by said one line terminal and cooperating with said cross-head means to provide a shunt circuit around said mechanism when the circuit interrupter is in the closed circuit position, and flexible conductor means interconnecting said cross-head means and said one line terminal and adapted to carry the line current after separation of said cross-head means from said resilient contact means during circuit interruption.

24. The combination with a circuit interrupter having separable terminals for interconnecting a pair of line terminals, of mechanism mounted on one line terminal and operatively connected to one of said separable terminals for separating the same and providing a circuit between said one line terminal and said one separable terminal, cross-head means connected to said one separable terminal and movable therewith, resilient contact means carried by said one line terminal and cooperating with said cross-head means to provide a shunt circuit around said circuit through said mechanism when the circuit interrupter is in the closed circuit position, and guide means cooperating with said cross-head means for effecting movement thereof in a predetermined plane.

25. The combination with a circuit interrupter having separable terminals for interconnecting a pair of line terminals, of mechanism mounted on one line terminal and operatively connected to one of said separable terminals for separating the same, cross-head means connected to said one separable terminal and movable therewith, resilient contact means carried by said one line terminal and cooperating with said cross-head means to provide a shunt circuit around said mechanism when the circuit interrupter is in the closed circuit position, slotted guide means carried by said one line terminal and cooperating with said cross-head means for effecting movement thereof in a predetermined plane, and contact strip means disposed in the slots of said guide means and engaging said cross-head means to provide a shunt circuit around said mechanism when the circuit interrupter is in the closed circuit position.

26. The combination with a circuit interrupter having separable terminals for interconnecting a pair of line terminals, of mechanism mounted on one line terminal and operatively connected to one of said separable terminals for separating the same, cross-head means connected to said one separable terminal and movable therewith, resilient contact means carried by said one line terminal and cooperating with said cross-head means to provide a shunt circuit around said mechanism when the circuit interrupter is in the closed circuit position, slotted guide means carried by said one line terminal and cooperating with said cross-head means for effecting movement thereof in a predetermined plane, contact strip means disposed in the slots of said guide means, contact buttons carried by said contact strip means to provide small area high pressure contact engagement with said cross-head means thereby shunting said mechanism when the circuit interrupter is in the closed circuit position, and spring means biasing said contact strip means toward said cross-head means.

27. The combination with a circuit interrupter having separable terminals for interconnecting a pair of line terminals, of mechanism mounted on one line terminal and operatively connected to one of said separable terminals for separating the same, cross-head means connected to said one separable terminal and movable therewith, resilient contact means carried by said one line terminal and coperating with said cross-head means to provide a shunt circuit around said mechanism when the circuit interrupter is in the closed circuit position, slotted guide means carried by said one line terminal and cooperating with said cross-head means for effecting movement thereof in a predetermined plane, contact strip means disposed in the slots of said guide means, contact buttons carried by said contact strip means to provide small area high pressure contact engagement with said cross-head means thereby shunting said mechanism when the circuit interrupter is in the closed circuit position, spring means biasing said contact strip means toward said cross-head means, means limiting the movement of said contact strip means toward said cross-head means when the latter is in the open circuit position, and strips of high conductivity non-corroding metal carried by said cross-head means and aligned with said contact buttons for low resistance contact engagement therewith.

28. A circuit interrupter for interconnecting a pair of line terminals comprising, in combination, a tubular housing, a pair of arcing terminals in said housing one being fixed therein and connected to one line terminal and the other being movable and connected to the other line terminal, generally convex spherical support means on said tubular housing, generally concave spherical support means on said one line terminal, and clamp means for securing said support means together with the convex and concave portions thereof in mutual engagement.

29. The combination with a circuit interrupter having separable terminals for interconnecting a pair of line terminals, of mechanism mounted on one line terminal and operatively connected to one of said separable terminals for separating the same, cross-head means connected to said one separable terminal and movable therewith, slotted guide means carried by said one line terminal and cooperating with each arm of said cross-head means for effecting movement thereof in a predetermined plane, flexible strip means on opposite sides of the slotted opening in each guide means, a contact button carried by each flexible strip to provide small area high pressure contact engagement with the contact surfaces of said cross-head means, and spring means aligned with each contact button for biasing the same into said high pressure contact engagement.

30. A circuit interrupter for interconnecting a pair of line terminals comprising, in combination, a tubular housing carried by one line terminal, a pair of arcing terminals in said tubular housing one being fixed therein and connected to said one line terminal and the other being movable lengthwise of said tubular housing, a mechanism housing carried by the other line terminal, a shaft rotatably mounted in said mechanism housing, a lever carried by said shaft and detachably connected to the movable arcing terminal, a spring inside said mechanism housing biasing said lever to operate said movable arcing terminal to the open circuit position, and crank means operatively connected to said shaft and disposed exteriorly of said mechanism housing for manually moving said lever against the biasing action of said spring to permit the connection of said movable arcing terminal to said lever.

31. A circuit interrupter comprising, in combination, first and second support means disposed in insulated spaced relation, socket means carried by said first support means, a tubular housing extending toward said second support means and having ball means thereon for interfitting with said socket means, clamp means for holding said ball and socket means in juxtaposed relation, a pair of terminals between which an arc is adapted to be formed, one being stationarily mounted with respect to said tubular housing and the other being movably mounted therein, and a mechanism carried by said second support means and operatively connected to the movable terminal for withdrawing it from the stationary terminal for extinguishing the arc therebetween.

32. Circuit interrupting apparatus for interconnecting a pair of line terminals and disposed to be tensioned by external spring means comprising, in combination, a tubular housing, a pair of arcing terminals between which an arc is adapted to be formed one being stationarily mounted with respect to said tubular housing and connected to one line terminal and the other being movable and connected to the other line terminal, fusible element means interconnecting said arcing terminals, means for automatically aligning said tubular housing with said external spring means, and means for clamping said tubular housing in the aligned position.

33. A circuit interrupter for interconnecting a pair of line terminals comprising, in combination, a housing, an arcing terminal carried by said housing and connected to one line terminal, a filling of solid arc extinguishing material in said housing having a central main bore and a plurality of symmetrically located auxiliary bores, a main arcing terminal and a plurality of auxiliary arcing terminals in said main and auxiliary bores respectively and connected to the other line terminal, fusible means connecting one end of each of said main and auxiliary arcing terminals and said arcing terminal carried by said housing, means interconnecting the other ends of said main and auxiliary arcing terminals in such manner that tension stress applied to said one end of said main arcing terminal is substantially uniformly distributed among said auxiliary arcing terminals, operating means external to said housing and operatively connected to said main arcing terminal for retracting the same, and self-aligning means mounting said housing for automatically aligning the same with said operating means.

34. A circuit interrupter for interconnecting a pair of line terminals comprising, in combination, a tubular housing having an exhaust opening at one end, a pair of arcing terminals in said housing one being fixed at said one end and connected to one line terminal and the other being movable and connected to the other line terminal, generally convex spherical support means on said tubular housing at said one end, generally concave spherical support means on said one line terminal, clamp means for securing said support means together with the convex and concave portions thereof in mutual engagement, and condenser means forming a part of and extending from said clamp means for receiving and cooling the products of the arc through said exhaust opening.

35. A circuit interrupter for interconnecting a pair of line terminals comprising, in combination, a housing, a pair of arcing terminals between which an arc is adapted to be formed one being stationarily mounted with respect to said housing and connected to one line terminal and the other being movable through said housing and connected to the other line terminal, mechanism adapted to be operatively connected to said movable terminal for withdrawing it from said stationary terminal including a spring biased arm, and manual means for moving said arm to tension said spring and permit operative interconnection of said movable terminal and said arm.

36. In a circuit interrupter, a pair of spaced conducting terminal members, conducting means for interconnecting said terminal members, said conducting means including separable contacts and a fusible section arranged in series relation and means independent of the arc formed for separating said contact means in response to fusion of said fusible section.

37. In a circuit interrupter, a pair of spaced conducting terminal members, conducting means for interconnecting said terminal members, said conducting means including separable contact means and a fusible section arranged in series relation, means for separating said contact means in response to fusion of said fusible section, and flexible conducting means arranged in parallel relation with said separable contact means and of less current carrying capacity than said contact means for carrying the arc current upon separation of said contact means.

38. In a circuit interrupter, a pair of spaced conducting terminal members, conducting means for interconnecting said terminal members, said conducting means including a movable contact member, separable contact means connecting one of said terminal members with said contact member, a permanent connection in parallel with said separable contact means and of less current carrying capacity than said contact means, a fusible element connecting the other of said terminal members with said movable contact member, and means for moving said contact member upon fusion of said fusible element to elongate the arc caused by the fusion of said element and to separate said separable contact means to transfer the arc current to said permanent connection.

39. A refill unit for a fuse device comprising means defining an arc passage, a conducting terminal disposed at one end of said arc passage, a movable conducting member in said passage, fusible means normally connecting said movable member with said terminal, and a contact secured to and movable with said conducting member to enable a separable circuit connection to be made with said conducting member.

40. A refill unit for a fuse device comprising means defining an arc passage, a conducting terminal disposed at one end of said arc passage, a movable conducting member in said passage, fusible means normally connecting one end of said movable member with said terminal, the other end of said conducting member extending exteriorly of said arc passage, and a contact carried by the exteriorly extending portion of said conducting member, said exteriorly extending portion having a mechanically engageable portion adjacent to said contact.

41. In a circuit interrupter, a pair of spaced conducting terminal members, conducting means for interconnecting said terminal members, said conducting means including separable contact means and a fusible section arranged in series relation, and resilient means for separating said contacts in response to fusion of said fusible section.

42. In a circuit interrupter, a pair of spaced conducting terminal members, conducting means for interconnecting said terminal members, said conducting means including separable contacts associated, respectively, with one of said terminal members and a movable rod-like terminal, fusible means connecting said rod-like terminal with the other of said terminal members, and resilient means biasing said rod-like terminal for movement to elongate the arc formed upon fusion of said fusible means and to separate said separable contacts.

43. A fuse device comprising, an insulator support, rigid conductor arms mounted on said insulator support, fuse link holding means comprising concave portions associated with said arms; a fuse link tensionally mounted between said fuse link holding means comprising a fusible section and conductor portions associated therewith, each of said conductor portions being provided with a convex contact portion adapted for complementative contact with said concave portions of said fuse link holding means; and spring means biasing said conductor portions apart.

44. A fuse device comprising, an insulator support, rigid conductor arms mounted on said insulator support and comprising a fixed arm and a pivoted arm, fuse link holding means comprising concave portions associated with said arms; a fuse link tensionally mounted between said fuse link holding means comprising a fusible section and conductor portions associated therewith, each of said conductor portions being provided with a convex contact portion adapted for complementative contact with said concave portions of said fuse link holding means; and spring means biasing said pivoted arm to assist in separating said conductor portions on blowing of said fusible section.

45. A fuse link comprising, a fusible section, an insulating tubular member around said fusible section, a terminal member having a convex contact portion immediately adjacent one end of said tubular member, a conductor extending from the other end of said tubular member and connected to said terminal member by said fusible section, and a convex contact portion on said conductor remote from said tubular member.

46. A fuse link comprising, a fusible section, an insulating tubular member around said fusible section, a terminal member having a convex contact portion immediately adjacent one end of said tubular member, a conductor extending from the other end of said tubular member and connected to said terminal member by said fusible section, a convex contact portion on said conductor remote from said tubular member, and a tool receiving portion forming a part of said fuse link and adapted for the reception of a tool employed in mounting said link in circuit fusing position.

47. In a circuit interrupter, a tubular closure of insulating material, a conducting terminal member adjacent each end of said closure, means defining an arc passage within said tubular closure, conducting means movable through said arc passage to establish an arc therein, fusible means electrically connecting said conducting means with one of said terminal members, separable contact means electrically connecting said conducting means with the other of said terminal members, a flexible conducting means connected in parallel with said separable contact means, and spring means responsive to the fusion of said fusible means for moving said conducting means through said arc passage to establish an arc therein and for separating said contact means to transfer the arc current to said flexible conducting means.

48. In a circuit interrupter for interconnecting a pair of line terminals, current conducting means comprising a stationary arcing terminal adapted to be connected to one of said line terminals, a second arcing terminal movable relative to said stationary arcing terminal and adapted to be connected to the other of said line terminals, a fusible element connecting said movable arcing terminal to said stationary arcing terminal, means for shunting the connection of said movable arcing terminal with said other line terminal comprising separable contacts having abutting engagement with each other, and means for separating said contacts upon fusion of said fusible element.

49. In a circuit interrupter for interconnecting a pair of line terminals, current conducting means comprising a stationary arcing terminal adapted to be connected to one of said line terminals, a second arcing terminal movable relative to said stationary arcing terminal and adapted to be connected to the other of said line terminals, a fusible element connecting said movable arcing terminal to said stationary arcing terminal, means for shunting the connection of said movable arcing terminal with said other line terminal comprising separable contacts having abutting engagement with each other and in which one of the contacts is yieldable relative to the other element, and means for separating said contacts upon fusion of said fusible element.

50. In a current interrupter for interconnecting a pair of line terminals, current conducting means comprising a stationary arcing terminal adapted to be connected to one of said line terminals, a second arcing terminal movable relative to said stationary arcing terminal and adapted to be connected to the other of said line terminals, a fusible element connecting said movable arcing terminal to said stationary arcing terminal, means for shunting the connection of said movable arcing terminal with said other line terminal comprising a contact carried by the former and a stationary contact associated with the latter for abutting engagement with each other, said stationary contact being yieldable relative to the contact carried by said movable arcing terminal, and means for separating said contacts upon fusion of said fusible element.

HUGH A. TRIPLETT.